US012003690B2

(12) United States Patent
Yamada et al.

(10) Patent No.: US 12,003,690 B2
(45) Date of Patent: Jun. 4, 2024

(54) INFORMATION PROCESSING APPARATUS, INFORMATION PROCESSING METHOD, AND STORAGE MEDIUM FOR COLOR ADJUSTING AT A TIME OF OUTPUTTING AN IMAGE BASED ON INPUT IMAGE DATA

(71) Applicant: CANON KABUSHIKI KAISHA, Tokyo (JP)

(72) Inventors: Michihiko Yamada, Ibaraki (JP); Katsuyuki Murakami, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/385,719

(22) Filed: Jul. 26, 2021

(65) Prior Publication Data
US 2022/0038604 A1     Feb. 3, 2022

(30) Foreign Application Priority Data

Aug. 3, 2020  (JP) ................................ 2020-131672

(51) Int. Cl.
*H04N 1/60* (2006.01)
(52) U.S. Cl.
CPC ......... *H04N 1/6058* (2013.01); *H04N 1/6027* (2013.01)
(58) Field of Classification Search
None
See application file for complete search history.

(56) References Cited

U.S. PATENT DOCUMENTS

| | | | | |
|---|---|---|---|---|
| 9,967,435 B2* | 5/2018 | Kobayashi | ......... | G06K 15/1878 |
| 11,323,579 B2* | 5/2022 | Yamada | ............... | H04N 1/6025 |
| 2005/0078327 A1* | 4/2005 | Majewicz | ............ | H04N 1/6005 |
| | | | | 358/1.9 |
| 2008/0018917 A1* | 1/2008 | Zhang | .................. | G06F 40/106 |
| | | | | 358/1.5 |
| 2008/0158578 A1* | 7/2008 | Kadota | ................ | G06F 3/1219 |
| | | | | 358/1.9 |

FOREIGN PATENT DOCUMENTS

| | | | |
|---|---|---|---|
| JP | 2005252728 A | * | 9/2005 |
| JP | 2005252728 A | | 9/2005 |

* cited by examiner

*Primary Examiner* — Barbara D Reinier
(74) *Attorney, Agent, or Firm* — CANON U.S.A., INC. IP Division

(57) ABSTRACT

It is guaranteed that a designated color that is a target of spot color matching is converted correctly into a destination color thereof at the time of output. In a case where drawing data for causing an image output apparatus to perform drawing of an image is generated, whether a designated color in a first color space, which is included in an input image, is converted into a destination color in a second color space, which can be handled by the image output apparatus, is determined at the time of output of the image. Then, in a case where it is determined that the conversion is performed, control is performed such that color adjustment is not performed for at least the designated color of colors included the input image.

8 Claims, 7 Drawing Sheets

INFORMATION PROCESSING APPARATUS, INFORMATION PROCESSING METHOD, AND STORAGE MEDIUM FOR COLOR ADJUSTING AT A TIME OF OUTPUTTING AN IMAGE BASED ON INPUT IMAGE DATA

BACKGROUND OF THE INVENTION

Field of the Invention

The aspect of the embodiments relates to a color adjustment technique at the time of outputting an image based on input image data.

Description of the Related Art

For the use to obtain a printed material including a corporate logo or a product logo, high color reproducibility is required for a designated color, such as a so-called corporate color and accompanying the improvement of performance of a recent household or office image forming apparatus, the POP printing or the like is performed in each shop or the like. Here, "POP" is an abbreviation of Point of purchase advertising. Then, there is a technique to output a destination color by attaching a color name (for example, Dark_RED and the like) to a designated color that is used for a corporate logo and the like and designating the color name at the time of printing so that even a user without expertise can reproduce a designated color at the time of printing. This technique is generally called "spot color matching". Further, a technique for performing spot color matching more easily has also been proposed. Japanese Patent Laid-Open No. 2005-252728 has disclosed a technique to, in a case where color values of a designated color are included in printing-target image data, convert the color values into color values of a destination color in accordance with a color conversion list by storing in advance the color conversion list in which color values (RGB values) of an adjustment-target designated color and color values (CMYK values) of the destination color thereof are associated.

Normally, printing-target image data is generated in a host PC or the like by using a printer driver and input to an image forming apparatus. Then, it is possible for the printer driver to adjust the tint, the brightness and the like at the time of printing (generally called "color adjustment"). Here, in a case where color values of a designated color in image data are changed by the color adjustment before the conversion using the above-described color conversion list is performed, it is no longer possible to perform spot color matching to convert the color values into color values of a destination color using the color conversion list.

The technique of the present disclosure has been made in view of the above-described problem and an object thereof is to guarantee that it is possible to correctly convert a spot color matching-target designated color into a destination color at the time of output.

SUMMARY OF THE DISCLOSURE

The information processing apparatus according to the present disclosure is an information processing apparatus including: a first performing unit configured to perform first setting for changing colors of an input image into colors that are based on the colors and second setting for changing a designated color of the input image into another designated color that is not based on the designated color; and a second performing unit configured to perform control such that the change based on the first setting is not performed based on the second setting having been enabled.

Further features of the present invention will become apparent from the following description of exemplary embodiments with reference to the attached drawings.

DESCRIPTION OF THE EMBODIMENTS

Hereinafter, with reference to the attached drawings, the present disclosure is explained in detail in accordance with embodiments. Configurations shown in the following embodiments are merely exemplary and the present disclosure is not limited to the configurations shown schematically.

Further, in each embodiment, explanation is given by taking a so-called MFP (Multi Function Printer) as an example of an image forming apparatus that forms an image on a printing medium by the electrophotographic method in accordance with printing-target input image data. However, the application range of the technique of the present disclosure is not limited to the MFP and it is possible to widely apply the technique to a general image output apparatus that outputs an image in accordance with input image data. That is, it is also possible to apply the technique to an image display device, such as a monitor and a projector, in addition to an image forming apparatus of other types, such as a copy machine, a laser printer, and an ink jet printer.

First Embodiment

<Configuration of Printing System>

Figure 1:
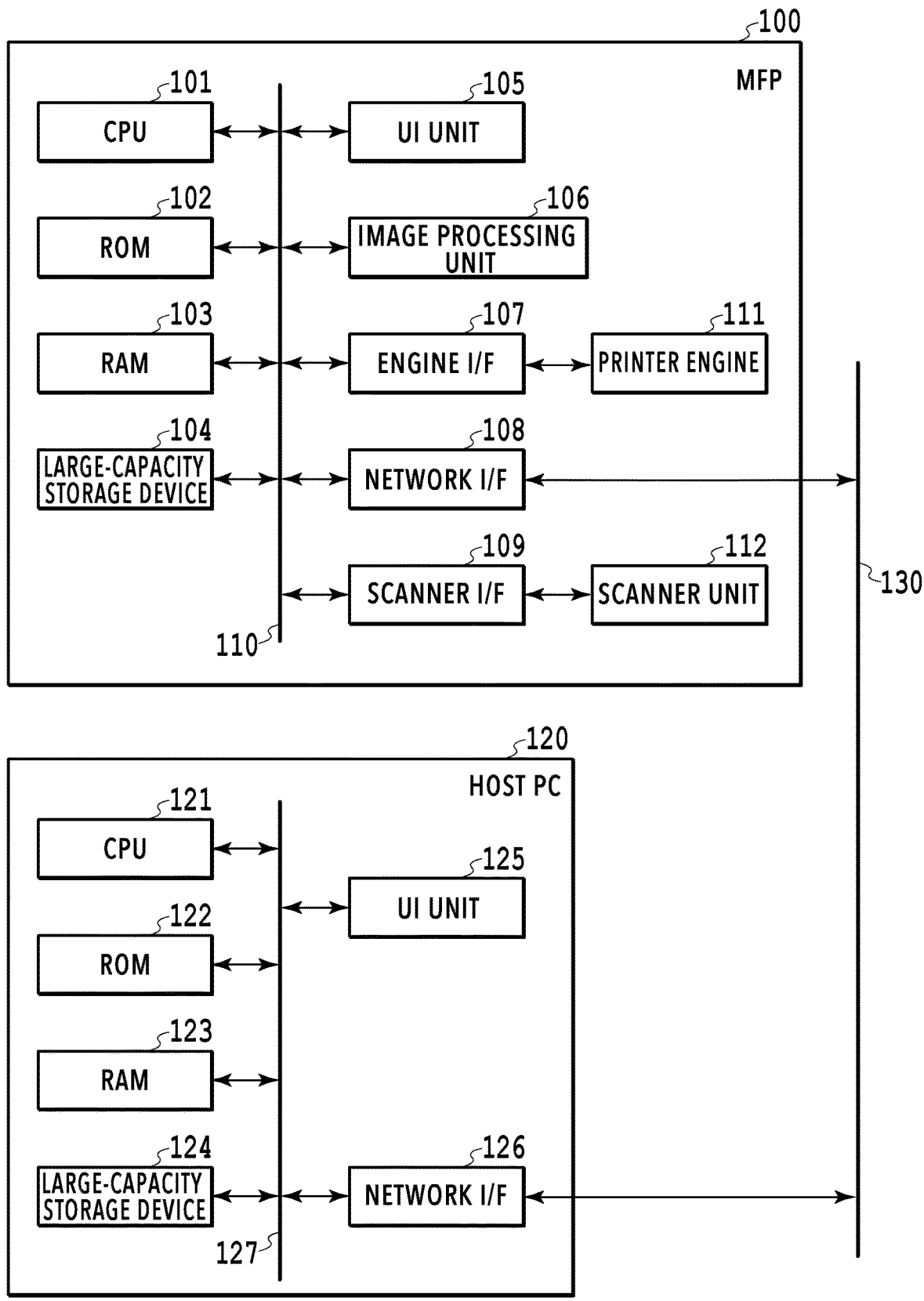
FIG. 1 is a block diagram showing a hardware configuration of a printing system.

FIG. 1 is a block diagram showing the hardware configuration of a printing system according to the present embodiment. The printing system includes an MFP 100 as an image forming apparatus and a host PC 120 as an information processing apparatus and the MFP 100 and the host PC 120 are connected via a network 130, such as a LAN.

<<Hardware Configuration of MFP>>

MFP 100 comprises a CPU 101, a ROM 102, a RAM 103, a large-capacity storage device 104, a UI unit 105, an image processing unit 106, an engine interface (I/F) 107, a network I/F 108, and a scanner I/F 109. Each of these units is connected to one another via a system bus 110. Further, the MFP 100 comprises a printer engine 111 and a scanner unit 112. The printer engine 111 and the scanner unit 112 are connected to the system bus 110 via the engine I/F 107 and the scanner I/F 109, respectively. It may also be possible to configure the image processing unit 106 as an image processing apparatus (image processing controller) independent of the MFP 100.

The CPU 101 controls the operation of the entire MFP 100. The CPU 101 performs various kinds of processing, to be described later, by reading programs stored in the ROM 102 onto the RAM 103 and executing the programs. The ROM 102 is a read only memory and stores a system activation program or programs for controlling the printer engine, and character data or character code information, and the like. The RAM 103 is a volatile random access memory and used as a work area of the CPU 101 and a temporary storage area of various kinds of data. For example, the RAM 103 is used as a storage area for storing font data registered additionally by download, or image files received from an external device, and the like. The large-capacity storage device 104 is, for example, an HDD and an SSD, and various kinds of data are spooled therein and is used for storing programs, various tables, information files, image data and the like and used as a work area.

The UI (User Interface) unit 105 includes a liquid crystal display (LCD) comprising, for example, a touch panel function, and displays a screen for notifying a user of the setting state of the MFP 100, the situation of processing being performed, the error state and the like. The UI unit 105 receives various user instructions, such as inputs of various setting values of the MFP 100 and the selection of various buttons, via a predetermined user interface screen (UI screen). It may also be possible for the UI unit 105 to separately comprise an input device, such as a hard key.

The image processing unit 106 analyzes drawing data (in the following, called "PDL data") that is input from the host PC 120 via the network 130 and which is described in PDL. Then, the image processing unit 106 performs color conversion processing by the method designated in the PDL and generates image data that the printer engine 111 can process. PDL is an abbreviation of page description language.

The engine I/F 107 functions as an interface for controlling the printer engine 111 in accordance with instructions from the CPU 101 at the time of performing printing. Via the engine I/F 107, engine control commands and the like are transmitted and received between the CPU 101 and the printer engine 111. The network I/F 108 functions as an interface for connecting the MFP 100 to the network 130. The network 108 may be, for example, a LAN or a public switched telephone network (PSTN). The printer engine 111 forms a multicolored image on a printing medium, such as paper, by using color materials (here, toner) of a plurality of colors (here, four colors of CMYK) based on image data received from the side of the system bus 110. The scanner I/F 109 functions as an interface for controlling the scanner unit 112 in accordance with instructions from the CPU 101 at the time of the scanner unit 112 reading a document. Via the scanner I/F 109, scanner unit control commands and the like are transmitted and received between the CPU 101 and the scanner unit 112. The scanner unit 112 generates read image data by optically reading a document under the control by the CPU 101 and transmits the read image data (scanned image data) to the RAM 103 or the large-capacity storage device 104 via the scanner I/F 109.

<<Hardware Configuration of Host PC>>

The host PC 120 comprises a CPU 121, a ROM 122, a RAM 123, a large-capacity storage device 124, a UI unit 125, and a network I/F 126. Each of these units is connected to one another via a system bus 127. The CPU 121 is a processor that controls the operation of the entire host PC 120 and reads control programs and application programs stored in the ROM 122 and performs various kinds of processing. The RAM 123 is used as a main memory of the CPU 121 and as a temporary storage area, such as a work area. The large-capacity storage device 124 is, for example, an HDD and an SSD, and stores image data and the like, in addition to various programs, such as a printer driver. The UI (User Interface) unit 125 includes, for example, a liquid crystal monitor, a keyboard and the like and is used to display various UI screens and receive user instructions. The network I/F 126 is an interface that connects the host PC 120 to the network 130. The host PC 120 transmits PDL data generated by using the installed printer driver to the MFP 100 via the network I/F 126 and causes the MFP 100 to perform printing processing.

<Function Configuration of Printer Driver>

Figure 2:
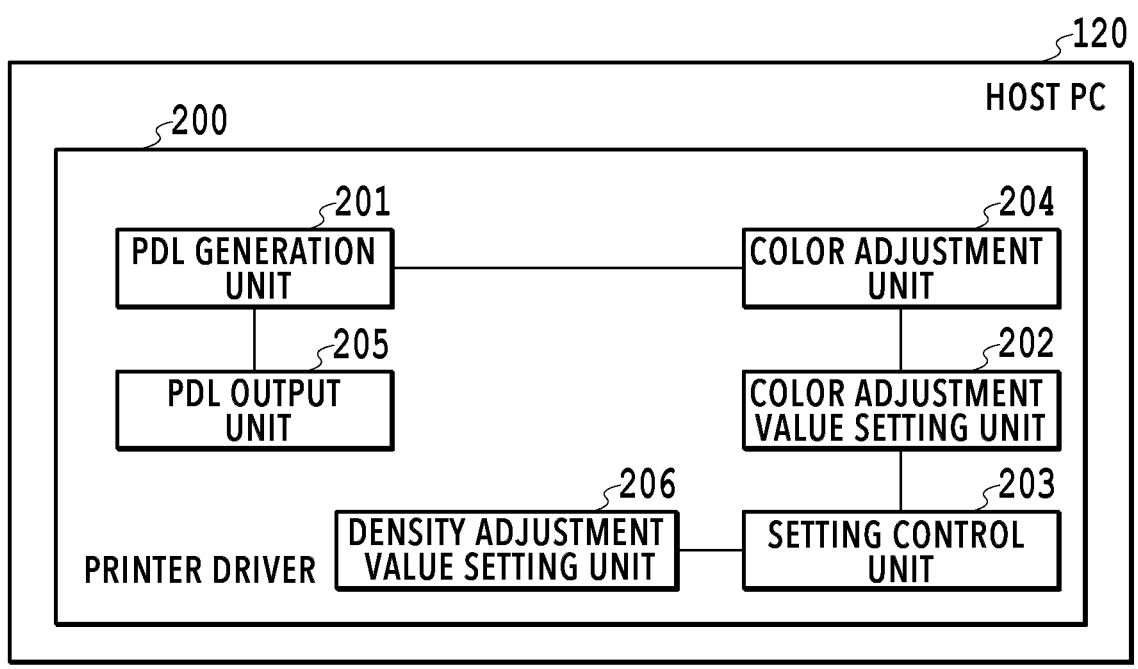
FIG. 2 is a function block diagram showing an internal configuration of a printer driver.

Following the above, the printer driver that is used at the time of generating PDL data is explained. FIG. 2 is a function block diagram showing the internal configuration of the printer driver according to the present embodiment. A printer driver 200 comprises a PDL generation unit 201, a color adjustment value setting unit 202, a density adjustment value setting unit 206, a setting control unit 203, a color adjustment unit 204, and a PDL output unit 205. Each of these function units operates on the operating system (OS) of the host PC 120.

The PDL generation unit 201 receives drawing information from a document creation application or the like installed in the host PC 120 via a GDI (Graphics Device Interface) prepared by the OS and generates PDL.

Figure 3:
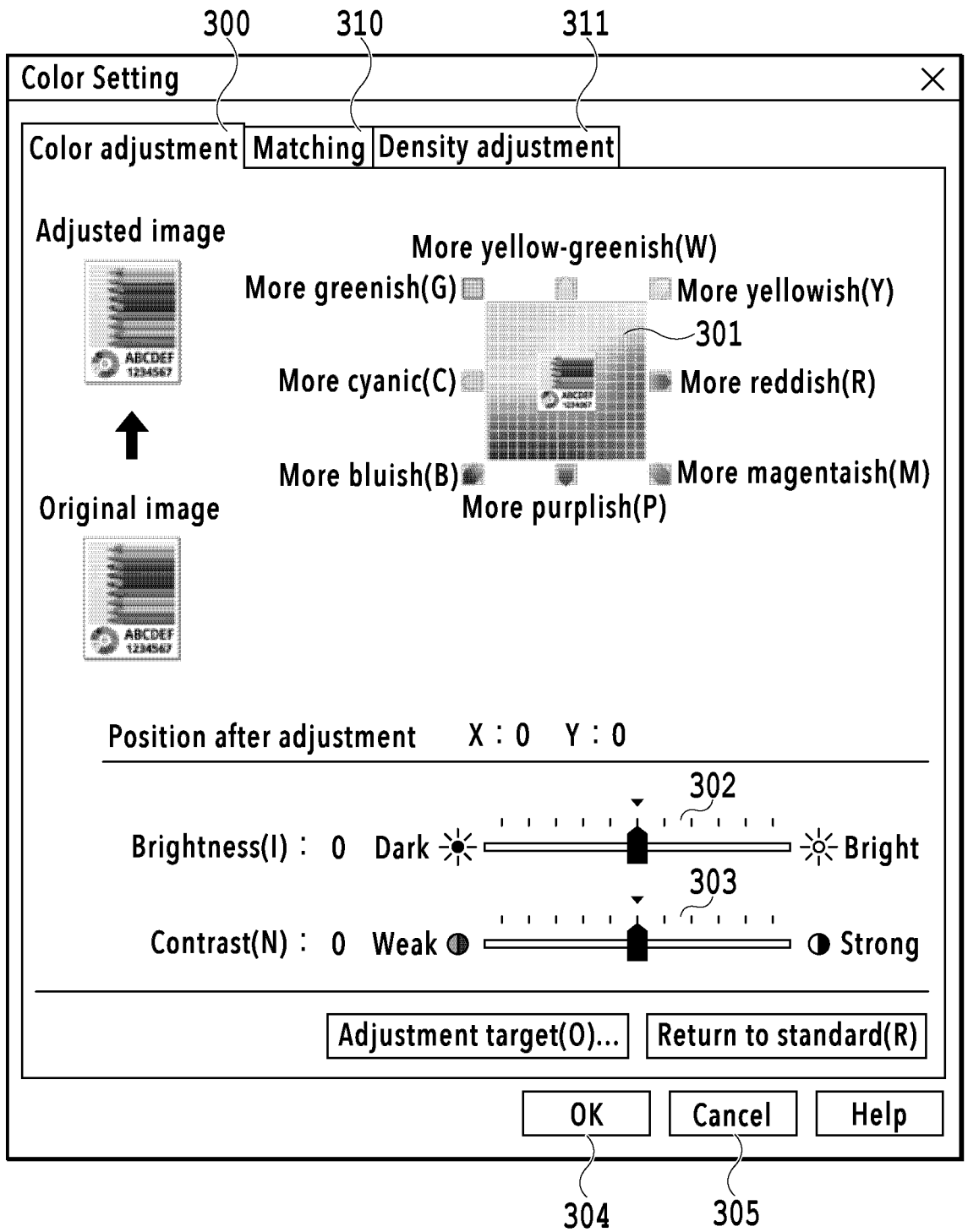
FIG. 3 is a diagram showing an example of a GUI for a user to perform setting relating to color adjustment.

The color adjustment value setting unit 202 receives a value relating to color adjustment, which is input on a graphical user interface (GUI) and sets the value as a color adjustment value. FIG. 3 is a diagram showing a state where a "Color adjustment" tab 300 is selected on a UI screen for color setting for a user to perform setting relating to color. A "Matching" tab 310 and a "Density adjustment" tab 311 will be described later. On the GUI in the state where the tab for color adjustment shown in FIG. 3 is selected, as items of color adjustment, three items exist: a color adjustment matrix 301 that adjusts the tint of an entire image, brightness adjustment 302 that adjusts the brightness of the entire image, and contrast adjustment 303 that adjusts the contrast of the entire image. The GUI shown here is an example and the items of color adjustment are not limited to those.

Figure 7:
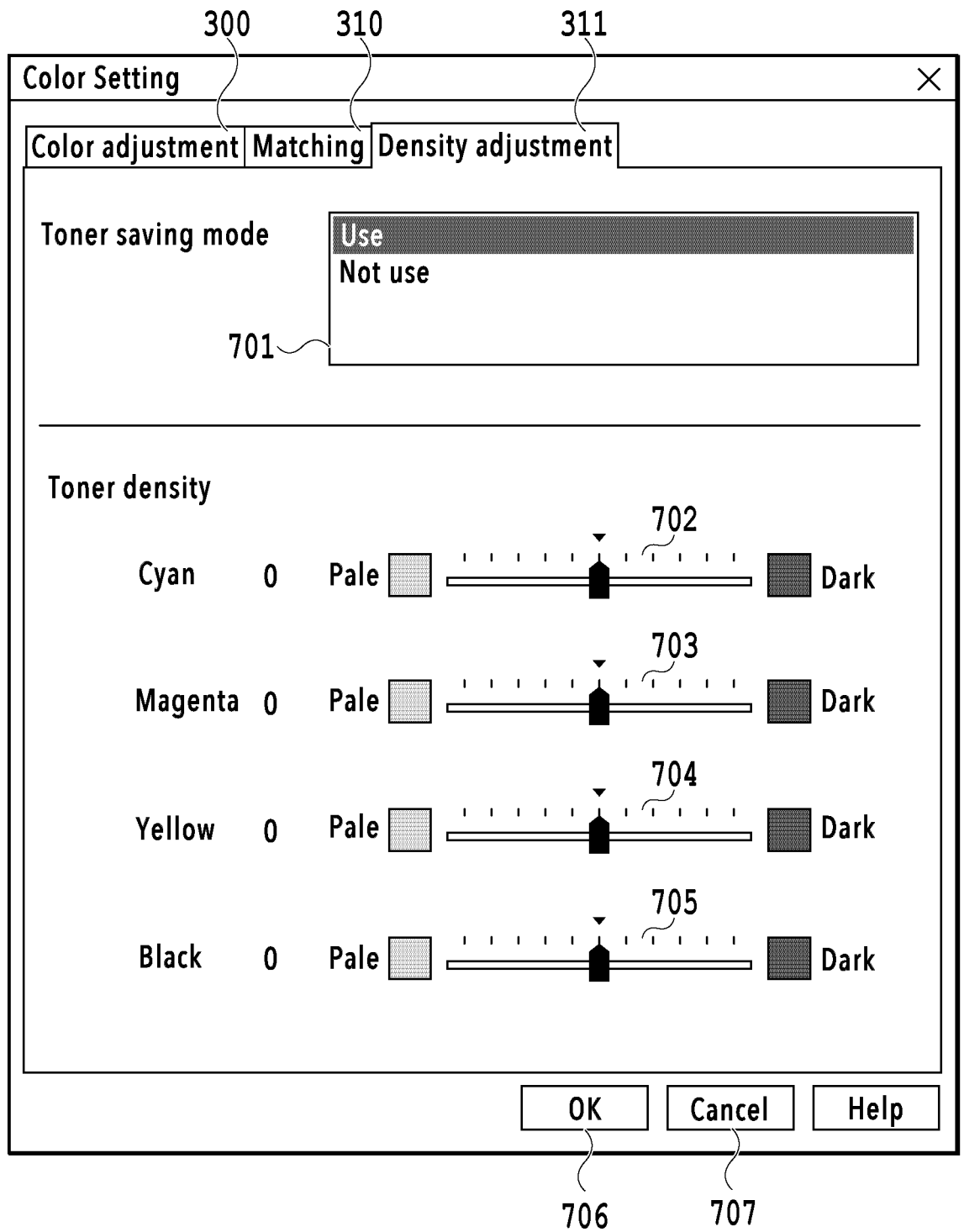
FIG. 7 is a diagram showing an example of a GUI for a user to perform setting relating to density adjustment.

The density adjustment value setting unit 206 receives a value relating to density adjustment, which is input on the graphical user interface, and sets the value as a density adjustment value. FIG. 7 is a diagram showing a state where the "Density adjustment" tab 311 is selected on the density setting UI screen for a user to perform the setting relating to density. On the GUI in the state where the tab for density adjustment is selected shown in FIG. 7, as items of density adjustment, the following five items exist. First, Toner saving mode 701 for suppressing toner consumption of an entire image, and toner adjustment 702, 703, 704, and 705 that adjust the density of each toner color (cyan, magenta, yellow, black). The GUI shown here is an example and the items of density adjustment are not limited to those.

The setting control unit 203 controls the color adjustment GUI shown in FIG. 3 described above and the color adjustment value that is set in the color adjustment value setting unit 202 in accordance with whether spot color matching is applied at the time of printing processing in the MFP 100. Similarly, the setting control unit 203 controls the density adjustment GUI shown in FIG. 7 described above and the density adjustment value that is set in the density adjustment value setting unit 206. In this case, whether or not the spot color matching is applied is determined based on the color conversion list prepared in advance. Table 1 below shows an example of the color conversion list.

TABLE 1

| Adjustment-target color | | | Destination color | | | |
|---|---|---|---|---|---|---|
| R | G | B | C | M | Y | K |
| 204 | 0 | 0 | 10 | 255 | 240 | 0 |
| 255 | 240 | 0 | 0 | 23 | 255 | 0 |
| 0 | 240 | 240 | 240 | 0 | 25 | 23 |

The color conversion list in Table 1 described above is a list that associates with each other input color values in which each color of RGB of a designated color (in the following, described as "adjustment-target color") that is the target of the spot color matching is represented by eight bits and output color values in which each color of CMYK of the destination color is represented by eight bits. The case of the color conversion list in Table 1 means that the spot color matching is applied to the three kinds of color specified by the RGB values at the time of printing processing in the MFP 100. In the present embodiment, the color conversion list as described above is stored in advance, for example, on the side of the MFP 100 and acquired (downloaded) at predetermined timing and used for determination, but the color conversion list may be stored in advance on the side of the host PC 120. Further, it may also be possible to create the color conversion list by using the MFP 100. As the creation method of the color conversion list, for example, there is a method as described in Japanese Patent No. 6501621. In this method, a chart including the output color values of CMYK of the destination colors and the output color values of the colors in the vicinity thereof is printed in the printer engine 11 for the input color values of RGB of the adjustment-target color. Then, in the printed chart, a patch desired by a user is selected and the output color values of CMYK corresponding thereto are registered as the output color values of the color conversion list. In a case where the setting relating to the density adjustment function is performed in advance and the setting contents are stored inside the MFP 100, it is assumed that printing is performed by using the density setting value of the density adjustment function as a default value at the time of printing of the chart. Details of the setting control unit 203 will be described later.

The color adjustment unit 204 performs adjustment of the color values (here, RGB values) based on the adjustment contents (adjustment value for each item) that are set in the color adjustment value setting unit 202. For example, in a case where the slider bar is advanced by two steps in the direction toward "Bright" in the brightness adjustment 302 on the GUI shown in FIG. 3 described previously, the color adjustment unit 204 performs calculation processing using formula (1) below for each 8-bit value of RGB.

$$N'=(N \div 255)^{0.8} \times 255 \quad \text{formula (1)}$$

In formula (1) described above, N' is the component value after adjustment and N is the component value before adjustment and both are integers in the range between 0 and 255. For example, in a case where the color of a certain pixel is (R, G, B)=(240, 120, 0), by formula (1) described above, this is adjusted to (R', G', B')=(243, 140, 0).

The PDL output unit 205 outputs PDL data for which color adjustment has been performed as needed. The output PDL data is transmitted to the MFP 100 by the network I/F 126.

<Function Configuration of Image Processing Unit>

Figure 4:
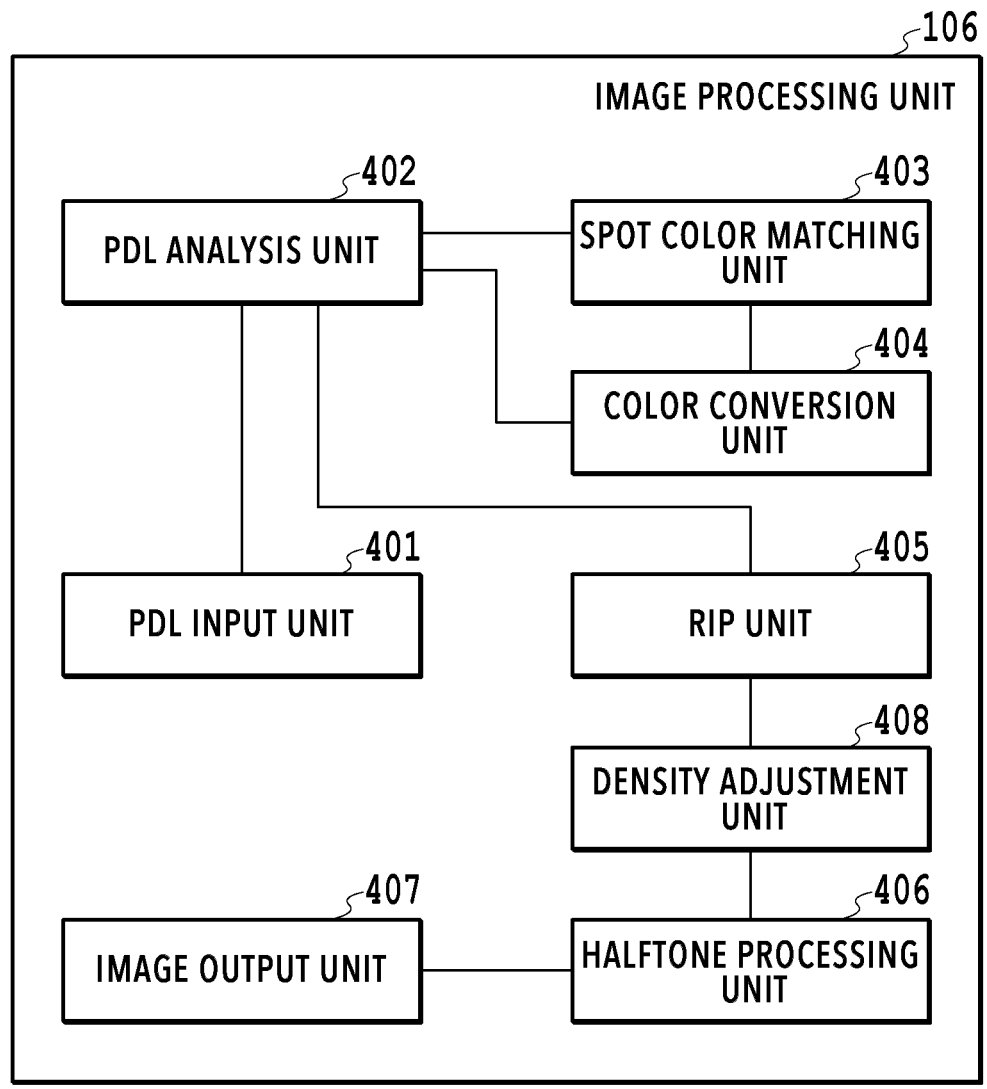
FIG. 4 is a function block diagram showing an internal configuration of an image processing unit.

Next, the image processing unit 106 of the MFP 100 is explained, which generates image data that the printer engine 111 can process based on the PDL data received from the host PC 120. FIG. 4 is a function block diagram showing the internal configuration of the image processing unit 106 according to the present embodiment. The image processing unit 106 comprises a PDL input unit 401, a PDL analysis unit 402, a spot color matching unit 403, a color conversion unit 404, a RIP unit 405, a halftone processing unit 406, an image output unit 107, and a density adjustment unit 408. Each of these units is implemented by the CPU 101 reading a program stored in the ROM 102 onto the RAM 103 and executing the program. Alternatively, part or all of these function units may be implemented by hardware, such as an ASIC and an electronic circuit.

The PDL input unit 401 receives the input of the PDL data that is transmitted from the host PC 100. The PDL data received as the input is stored in the RAM 103 or the large-capacity storage device 104.

The PDL analysis unit 402 reads the PDL data from the RAM 103 or the like and analyzes the PDL data. Then, the PDL analysis unit 402 acquires information on the attribute (text, graphics, image and the like), the color values (here, RGB values) and the like of a drawing-target object and controls the spot color matching unit 403 and the color conversion unit 404, to be described later, and generates control commands of the RIP unit 405.

The spot color matching unit 403 converts, in a case where the color values (RGB values) obtained by analyzing the PDL match with the input color values of the adjustment-target color in the color conversion list, the color values into the output color values (here, CMYK values) that are the destination color thereof. In a case where the color values obtained by the PDL analysis and the input color values registered in the color conversion list do not match with each other, it is meant that the target color of the spot color matching is not included in the printing-target input image, and therefore, the color conversion in the spot color matching unit 403 is not performed.

The color conversion unit 404 performs predetermined color processing for the color values obtained by analyzing the PDL. In a case of the present embodiment, the color values obtained by analyzing the PDL are RGB values and the color values that the printer engine 111 of the MFP 100 can process are CMYK values, and therefore, processing (color matching processing) to convert the RGB values into CMYK values using an ICC profile prepared in advance is performed. Here, it may also be possible to read the ICC profile stored in the large-capacity storage device 104 or the like or acquire the ICC profile by downloading it from an external device, such as the host PC 120, via the network 130.

The RIP (Raster Image Processor) unit 405 generates image data (in the following, described as "CMYK raster image data") in the raster format represented in the CMYK color space by using the RIP unit control command generated by the PDL analysis unit 402.

The density adjustment unit 408 performs adjustment of the color values (CMYK values) based on the adjustment contents (adjustment value for each item) that are set in the density adjustment setting unit 206 for the CMYK raster image data generated by the RIP unit 405. For example, in a case where the slider bar is advanced by two steps in the direction toward "Pale" in the toner adjustment 702 of cyan on the GUI shown in FIG. 7 described previously, the density adjustment unit 408 performs calculation processing using formula (2) below for the 8-bit color value of cyan.

$$N'=(N \div 255)^{1.2} \times 255 \quad \text{formula (2)}$$

In formula (2) described above, N' is the component value after adjustment and N is the component value before adjustment and both are integers in the range between 0 and 255. In a case where the base that is raised to powers is a decimal and the exponent exceeds 1, N' becomes smaller than N, and therefore, the density becomes pale at the time of printing. For example, in a case where the color of a certain pixel is (C, M, Y, K)=(200, 150, 0, 0), by formula (2) described above, the color is adjusted to (C', M', Y', K')= (191, 150, 0, 0).

The half tone processing unit 406 generates print image data (halftone image data) represented by halftone dots, which the printer engine 111 can process, by performing halftone processing for the image data after the density adjustment, which is received from the density adjustment unit 408. In many cases, it is normally possible for the printer engine 111 to output image data with a number of tones smaller than that of the input image data, such as two tones, four tones, and 16 tones. Because of this, the halftone processing is performed so that it is made possible to represent a stable halftone even in a case where the image data is printed and output with a small number of tones as described above. The method of halftone processing includes the density pattern method, the systematic dither method, the error diffusion method and the like and it is possible to apply these publicly known methods.

In a case of receiving print image data from the halftone processing unit 406, the image output unit 407 transmits the print image data to the printer engine 111 via the engine I/F 107. The CPU 100 gives instructions to form an image based on the print image data to the printer engine 111. The printer engine 111 forms and outputs a color image in accordance with the input print image data onto a printing medium by performing each process, such as exposure, development, transfer, and fixing.

<Details of Setting Control Unit>

Figure 5:
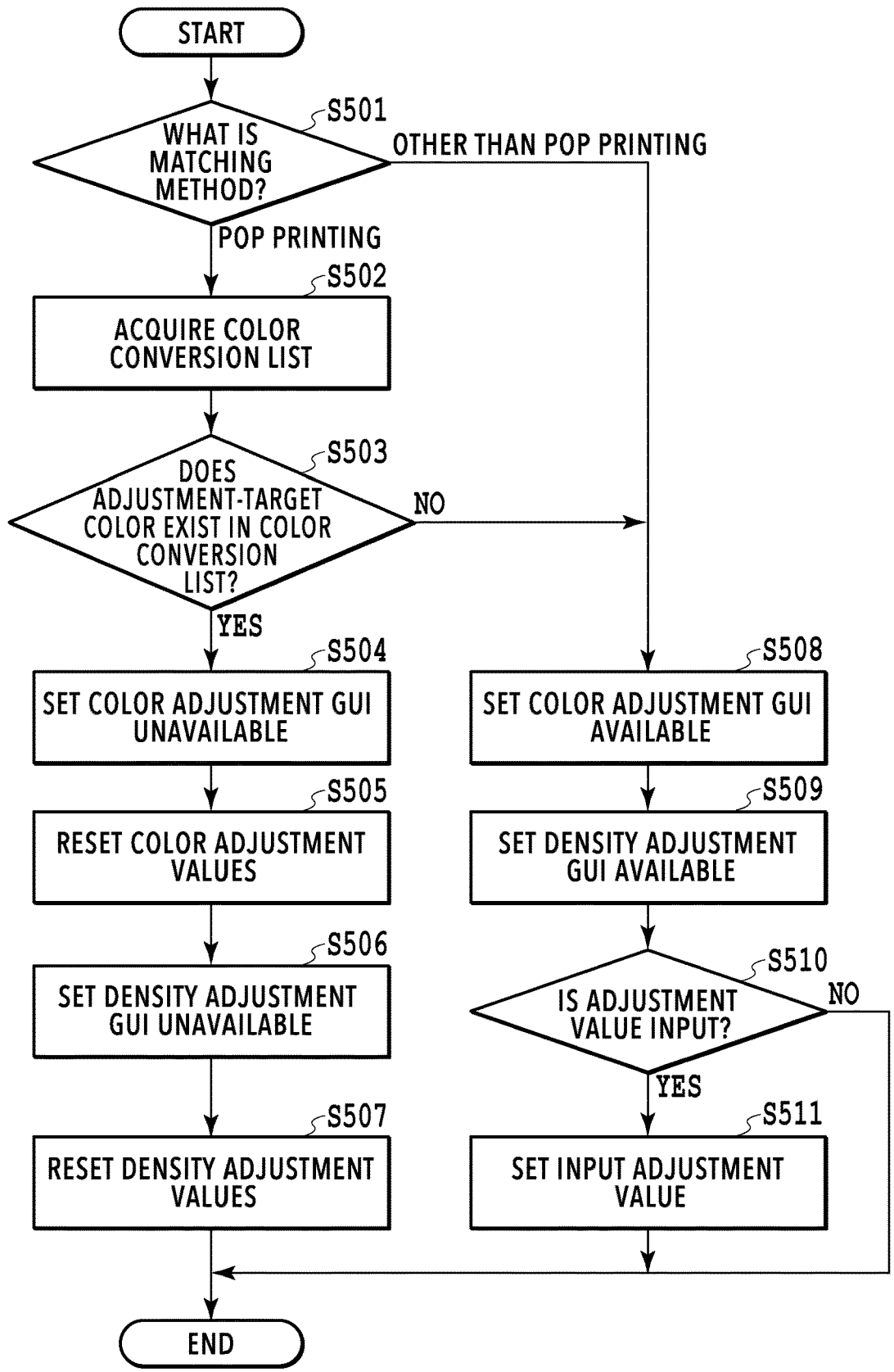
FIG. 5 is a flowchart showing a flow of a control operation performed by a setting control unit of the printer driver.
Figure 6:
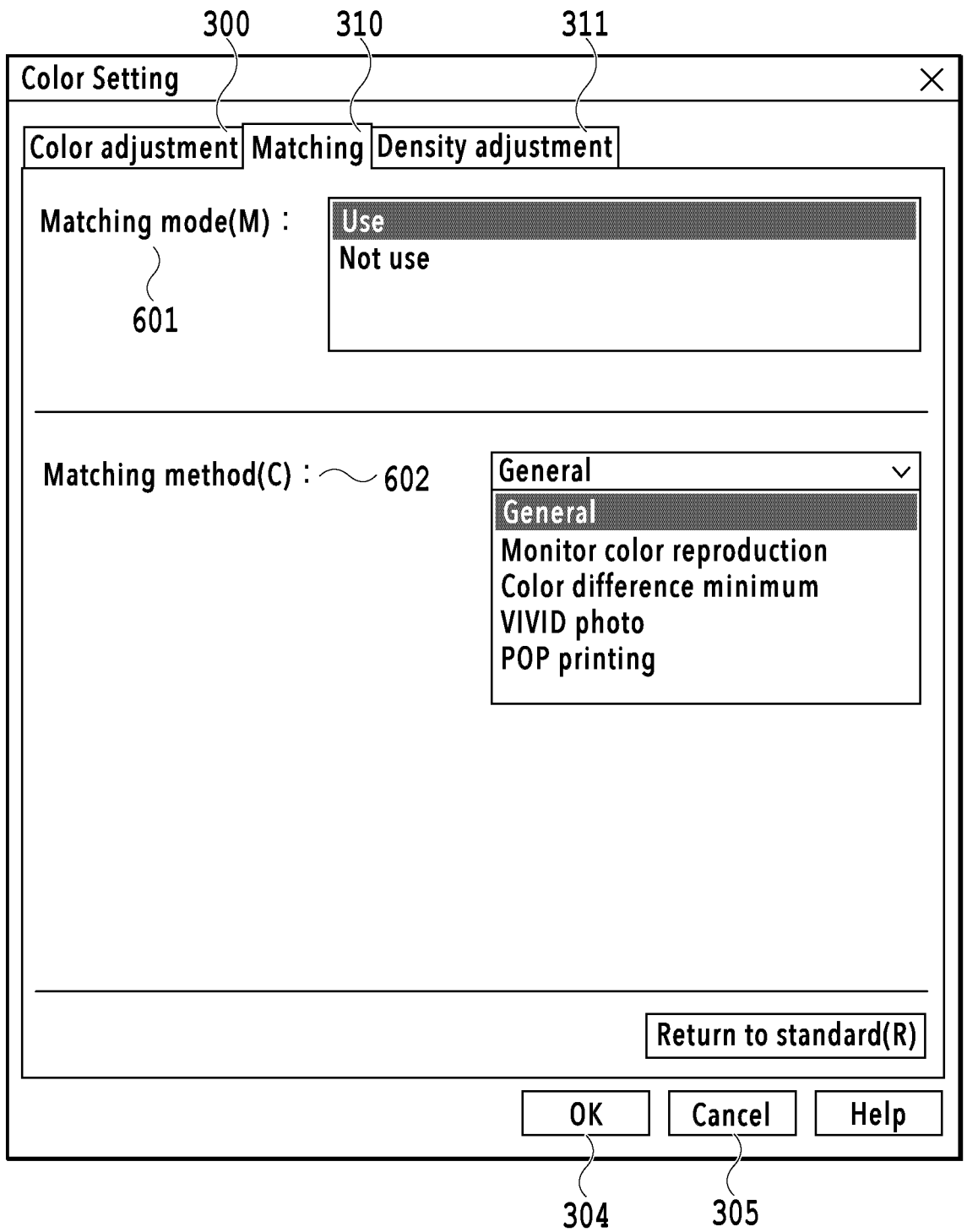
FIG. 6 is a diagram showing an example of a GUI for a user to perform setting relating to color matching.

Next, the control operation performed by the setting control unit 203 of the printer driver 200 is explained in detail along the flowchart in FIG. 5. The series of processing shown in the flowchart in FIG. 5 is implemented by the CPU 121 of the host PC 120 reading the program corresponding to the printer driver 200 onto the RAM 123 and executing the program. Further, the execution of the series of processing is started in response to a user selecting "Use" in the setting in "Matching mode" 601 and pressing down an "OK" button 304 in the state where the "Matching" tab 310 on the color setting GUI is selected as shown in FIG. 6. Symbol "S" in the explanation of each piece of processing means a step.

At S501, the next step is determined in accordance with the setting contents of "Matching method" 602 on the GUI in the state where the "Matching" tab 310 is selected. The color conversion list for spot color matching is associated with a predetermined matching method. Here, in a case "POP printing", as described previously, it is necessary to exactly reproduce the corporate color and the like, and therefore, it is assumed that the color conversion list is associated. On other hand, it is assumed that the color conversion list is not associated with each matching method of "General", "Monitor color reproduction", "Color difference minimum", and "VIVID photo". Consequently, in a case where one of "General", "Monitor color reproduction", "Color difference minimum", and "VIVID photo" is selected, in order to display the GUI for color adjustment in the state where it can be used, that is, in the state where it is possible to receive an input of an adjustment value, the processing advances to S506. On the other hand, in a case where "POP printing" is selected, in order to acquire the color conversion list, the processing advances to S502.

At S502, the color conversion list described previously is acquired from the MFP 100 via the network 130. In the present embodiment, the color conversion list is acquired by receiving it from the MFP 100, but it may also be possible to acquire the color conversion list by reading it stored in advance within the large-capacity storage device within the host PC 120.

At S503, whether one or more adjustment-target colors are registered in the color conversion list acquired at S502 is determined. In the example of the color conversion list shown in Table 1, it is determined that three adjustment-target colors of (R, G, B)=(204, 0, 0), (R, G, B)=(255, 240, 0), and (R, G, B)=(0, 240, 240) are registered. In a case where the adjustment-target color is registered, the processing advances to S504 and in a case where no adjustment-target color is registered, the processing advances to S508.

At S504 on a condition that there is a registered adjustment-target color, in a case where the "Color adjustment" tab 300 is selected on the color setting GUI described previously, the display control setting is performed so that the UI screen shown in FIG. 3 described previously is displayed grayed out. That is, a user having selected the "Color adjustment" tab 300 views the UI screen displayed grayed out and grasps that it is not possible to perform the setting of color adjustment (use of the color adjustment function is prohibited). Then, at next S505, various setting values for color adjustment are reset. Specifically, for each item, such as tint, brightness, and contrast, a default value determined in advance is set, respectively.

At S506 after the reset of the color adjustment setting value is completed, in a case where the "Density adjustment" tab 311 is selected on the color setting GUI described previously, the display control setting is performed so that the UI screen shown in FIG. 7 described previously is displayed grayed out. That is, as in the case of color adjustment, a user having selected the "Density adjustment" tab 311 views the UI screen displayed grayed out and grasps that it is not possible to perform the setting of density adjustment (use of the density adjustment function is prohibited). Then, at next S507, various setting values for density adjustment are reset. Specifically, for each item, such as the toner saving mode and each color (CMYK) of the toner density, a default value determined in advance is set, respectively. After the reset of the density adjustment setting value is completed, this processing is exited.

On the other hand, at S508 on a condition that there is no registered adjustment-target color, in a case where the "Color adjustment" tab 300 is selected on the color setting GUI described previously, the display control setting is performed so that the UI screen shown in FIG. 3 described previously is displayed in the state where the UI screen can be used, that is, in the state where a user can input a value relating to color adjustment. Then, in a case where the "Color adjustment" tab 300 is selected actually, the GUI shown in FIG. 3 is displayed without being grayed out. At S509 that follows, in a case where the "Density adjustment" tab 311 is selected on the density setting GUI described previously, the display control setting is performed so that the UI screen shown in FIG. 7 described previously is displayed in the state where the UI screen can be used, that is, in the state where a user can input a value relating to density adjustment. Then, in a case where the "Density adjustment" tab 311 is selected actually, the GUI shown in FIG. 7 is displayed without being grayed out. S510 that follows is processing to check whether a value about one of the items of color adjustment and density adjustment is input by a user. In a case where a user inputs a value about one of the items in the state where the "Color adjustment" tab 300 or the "Density adjustment" tab 311 is selected and presses down the "OK" button 304 or an "OK" button 706, the processing advances to S511. On the other hand, in a case where the "Cancel" button 305 or a "Cancel" button 707 is pressed down without no value being input, this processing is exited without performing anything.

At S511, the value that is input by a user is set as the adjustment value of the color adjustment item corresponding thereto. After the setting is completed, this processing is terminated.

The above is the flow of the control operation performed by the setting control unit 203 of the printer driver 200. The flowchart in FIG. 5 is a flow on the premise that the setting of color adjustment is performed following the setting of color matching. In a case where the setting of color adjustment or density adjustment has been performed previously, it is sufficient to invalidate the color adjustment function and the density adjustment function at the time of "POP printing" being selected in the setting of color matching that follows. At this time, it may also be possible to display a message indicating that the color adjustment and the density adjustment are invalidated. Alternatively, it may also be possible to display a warning message, such as "Color adjustment and density adjustment are invalidated. Is this OK?", at timing at which a user selects "POP printing". Due to this, the same results are obtained.

Further, in the present embodiment, the case is explained where the setting of the density adjustment function is implemented by using the printer driver 200. However, it is also possible to apply the contents of the present embodiment to so-called direct print, in which an image file is transmitted directly from the host PC 120 to the MFP 100 without the intervention of the printer driver 200 and printing is performed. For example, a UI screen (UI screen similar to that in FIG. 6 and FIG. 7) for performing the setting necessary for the color matching and the density adjustment function described above is displayed by using the UI unit 105 of the MFE 100 and the setting necessary for each function is performed by storing the set adjustment values in the large-capacity storage device 104, and then, in a case where "POP printing" is set in the setting of the color matching, by cancelling the processing of the density adjustment unit 408 and performing printing, the same results as those in a case where printing of "POP printing" is performed by using the printer driver are obtained also in direct print. As the image file format of a printing target in the present embodiment, TIFF (Tagged Image File Format) and PDF (Portable Document Format) are supposed, but the image file format may be one other than TIFF and PDF.

Modification Example 1

Further, in the above-described embodiment, the color adjustment function and the density adjustment function are prevented from being used by displaying the GUI for color adjustment and the GUI for density adjustment grayed out. However, a case is also considered where it is desired to perform in advance the setting of color adjustment and density adjustment for printing by another matching method (printing that does not perform spot color matching) that does not utilize the color conversion list although "POP printing" is selected in the matching method 602. Consequently, it may also be possible to keep available the setting itself for color adjustment and density adjustment (the setting is not displayed grayed out) even in a case where an adjustment-target color is registered in the color conversion list. At that time, it is sufficient to, only in a case where the matching method in which the color conversion list is associated, such as the POP printing, is selected, ignore the values that are input for color adjustment and density adjustment and set default values instead, and display a message indicating that "the color adjustment function and the density adjustment function are not applied to the POP printing" so that a user can recognize the fact. Due to this, it is also made possible to perform the setting of color adjustment and density adjustment in advance for the kind of printing that does not utilize the spot color matching while obtaining the same effects as those of the embodiment described above.

Modification Example 2

Further, in the embodiment described above, the functions themselves of color adjustment and density adjustment are invalidated at the time of selecting "POP printing" as the matching method. However, it may also be possible to, while converting the adjustment-target color registered in the color conversion list into a destination color so that an appropriate output color can be obtained, apply color adjustment to colors other than the adjustment-target color. A specific procedure is as follows.

<<Printer Driver Side>>

1) Receive the value of color adjustment.
2) Acquire the color conversion list.
3) Generate PDL based on drawing information.
4) Compare all colors (RGB values) included in the PDL and adjustment-target colors (RGB values) registered in the color conversion list.
5) Convert the color of the colors included in the PDL, which coincides with the adjustment-target color registered in the color conversion list, into a destination color (CMYK values) in accordance with the color conversion list. On the other hand, change the color values (RGB values) of the remaining colors within the PDL in accordance with the received value of color adjustment.
6) Output the converted/changed PDL.

<<MFP Side>>

1) Receive PDL from the printer driver.
2) Extract colors by analyzing the received PDL.
3) In a case where the extracted color is RGB values, perform color conversion into CMYK values in accordance with the ICC profile and invalidate density adjustment. On the other hand, in a case where the extracted color is not RGB values but CMYK values, leave it as it is (not perform color conversion) and validate density adjustment.
4) In a case where density adjustment of the extracted color is invalid, leave the CMYK values as they are (not perform density adjustment) for the CMYK raster image data. On the other hand, in a case where density adjustment of the extracted color is valid, change each color values (CMYK values) in accordance with the received value of density adjustment.
5) Generate halftone image data by performing halftone processing for the CMYK image data for which density adjustment has been performed.

By the processing as above, it is possible to apply, while reproducing a color for which it is desired to apply spot color matching by a destination color, color adjustment and density adjustment for colors other than the color.

As above, according to the present embodiment, at the time of generating PDL data in the printer driver, in a case where spot color matching is applied at the time of printing processing, the color adjustment function and the density adjustment function are prevented from operating. Due to this, in a case where printing processing is performed by applying spot color matching, such as POP printing, it is made possible to appropriately reproduce a designated color, such as a corporate color, by the destination color thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to correctly convert a designated color, which is the target of spot color matching, into a destination color at the time of output.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-131672, filed Aug. 3, 2020 which is hereby incorporated by reference wherein in its entirety.

What is claimed is:

1. An information processing apparatus that generates drawing data for causing an image output apparatus to draw an input image, the information processing apparatus comprising:
    at least one processor; a memory coupled to the at least one processor storing instructions that, when executed by the at least one processor, cause the at least one processor to function as:
    an adjustment unit configured to adjust at least one of a tint, brightness, contrast and density of a color represented in a first color space, which is included in the input image;
    a receiving unit configured to receive designation of a predetermined color matching method from a plurality of color matching methods, wherein the predetermined color matching method is a method for printing point of purchase advertising:
    a control unit configured to control adjustment in the adjustment unit in accordance with whether a designated color in the first color space, which is included in the input image, is converted into a destination color, which is associated with the designated color in advance, in a second color space, which can be handled by the image output apparatus, in a case where drawing of the input image is performed in the image output apparatus; and
    a generation unit configured to generate the drawing data for the input image,
    wherein the control unit performs control such that adjustment is not performed in the adjustment unit for at least the designated color of colors included in the input image in a case where the conversion is performed in the image output apparatus and where the conversion is performed on the basis that the receiving unit has received the designation of the predetermined color matching method.

2. The information processing apparatus according to claim 1, wherein the control unit performs control such that adjustment is not performed in the color adjustment unit for every color included in the input image in a case where the conversion is performed on the basis that the receiving unit has received the designation of the predetermined color matching method in the image output apparatus.

3. The information processing apparatus according to claim 1, wherein the control unit acquires a color conversion list in which the designated color in the first color space and the destination color in the second color space are registered in association with each other and performs the control by determining that the conversion is performed on the basis that the receiving unit has received the designation of the predetermined color matching method in the image output apparatus in a case where one of colors included in the input image matches with the designated color registered in the color conversion list.

4. The information processing apparatus according to claim 1, further comprising:
    a user interface unit configured to receive user instructions for the adjustment,
    wherein the control unit performs control such that the user instructions cannot be input in the user interface unit in a case where the conversion is performed on the basis that the receiving unit has received the designation of the predetermined color matching method in the image output apparatus.

5. The information processing apparatus according to claim 4, wherein the control unit performs control such that a value for the adjustment cannot be input in the user interface unit by displaying a user interface screen grayed out, on which to input a value for the adjustment.

6. The information processing apparatus according to claim 1, further comprising:
    a user interface unit configured to receive user instructions for the adjustment, wherein
    the control unit sets a value determined in advance in place of a value for the adjustment, which is input via the user interface unit, in a case where the conversion is performed on the basis that the receiving unit has received the
    designation of the predetermined color matching method in the image output apparatus.

7. The information processing apparatus according to claim 3, wherein
   the color conversion list is stored in the image output apparatus and
   the control unit acquires the color conversion list from the image output
   apparatus and determines whether one of colors included in the input image matches with the designated color registered in the color conversion list.

8. The information processing apparatus according to claim 1, wherein the first color space is RGB and the second color space is CMYK.

\* \* \* \* \*